United States Patent

Brown

Patent Number: 6,076,044
Date of Patent: Jun. 13, 2000

[54] WEATHER DETECTOR

[76] Inventor: Anthony Brown, 5218 Carswell Ave. #205, Suitland, Md. 20746-3937

[21] Appl. No.: 09/246,784

[22] Filed: Feb. 1, 1999

Related U.S. Application Data

[63] Continuation of application No. 08/799,838, Feb. 13, 1997, Pat. No. 5,978,738.

[51] Int. Cl.$^7$ .................................................. H06G 19/00
[52] U.S. Cl. ................................................................ 702/3
[58] Field of Search ............................................. 702/3, 4

[56] References Cited

U.S. PATENT DOCUMENTS

| | | | |
|---|---|---|---|
| 3,603,951 | 9/1971 | Bracken et al. | 702/3 |
| 4,035,802 | 7/1977 | Jagermalm et al. | 702/3 |
| 4,277,845 | 7/1981 | Smith et al. | 702/3 |
| 4,716,411 | 12/1987 | Nakamura | 702/3 |
| 5,499,024 | 3/1996 | Germanton et al. | 702/3 |
| 5,517,193 | 5/1996 | Allison et al. | 702/3 |

*Primary Examiner*—Donald E. McElheny, Jr.
*Attorney, Agent, or Firm*—Banner & Witcoff, Ltd.

[57] ABSTRACT

A compact, portable weather station for predicting local extreme weather conditions and for reporting remote weather conditions. The weather station has sensors for determining local temperature, barometric pressure, humidity, ambient light, and ambient static charge. A microprocessor has memory for storing data relating to past weather conditions and data processing apparatus and algorithms for determining probable developing weather conditions responsive to sensed local conditions. The weather station has a radio receiver for communicating with global weather reporting communications systems utilizing cellular communications. Operating commands, predicted local weather conditions, and remote weather conditions are annunciated in synthesized voice in any one of a variety of predetermined languages. The weather station includes voice synthesizing and recognition apparatus for annunciating verbal prompts and weather conditions, and for responding to vocal control. The weather station is formed in two separable components, one having sensors and the other having radio communications apparatus. The microprocessor is preferably contained within the component having radio communications apparatus. Each component preferably has a battery for providing power.

31 Claims, 13 Drawing Sheets

WEATHER DETECTOR

This is a continuation of U.S. patent application Ser. No. 08/799,838 to Brown, filed on Feb. 13, 1997, U.S. Pat. No. 5,978,738.

BACKGROUND OF THE INVENTION

1. Field of the Invention

The present invention relates to an unmanned weather detecting and reporting station. More specifically, the novel station has apparatus for detecting severe weather conditions such as tornadoes and lightning. The station has sensors for sensing certain critical ambient characteristics, a microprocessor for comparing sensed data to a database, a radio for receiving weather data from remote broadcasting sources, and apparatus for broadcasting inferred and reported weather patterns.

2. Description of the Prior Art

Severe weather conditions can arise quite suddenly, with potentially great catastrophic consequences in financial and human cost. To avoid or minimize injury and damage from sudden, violent weather phenomena, it is desirable to be able to predict such occurrences. If weather conditions can be predicted, it is possible in many instances to take steps to mitigate undesirable consequences of the unleashed forces.

An example of a field of activity which could benefit greatly from such analysis and warning of weather conditions is that of aviation. Take off and landing are subject to disruption from extreme weather conditions. Aircraft may be rerouted or their departures and landings postponed if significant threats from weather are identified. Therefore, a need clearly exists for detection and annunciation of extreme weather conditions.

The prior art has suggested a number of weather analysis and warning systems. U.S. Pat. No. 5,105,191, issued to Edgar L. Keedy on Apr. 14, 1992, describes apparatus and method for detecting and indicating severe air disturbances such as shear winds and clear air turbulence. This invention does not address electrical phenomena, as it is primarily intended for providing information essential for take off and landing decisions for advising aircraft pilots. By contrast, the present invention considers different parameters, and detects electrical phenomena such as lightning.

Apparatus and method for identifying tornadoes are set forth in U.S. Pat. No. 5,355,350, issued to Henry E. Bass et al. on Oct. 11, 1994. The subject method employs detection and analysis of ambient sound for amplitude and frequency which may be associated with tornadoes. By contrast, the present invention considers other parameters of ambient conditions, and predicts both tornadoes and also electrical phenomena, such as lightning.

Another tornado detection scheme is seen in U.S. Pat. No. 5,379,025, issued to Frank B. Tatom et al. on Jan. 3, 1995. This invention monitors seismic waves generated by an impending tornado. By contrast, the present invention does not consider seismic phenomena, looking instead to airborne phenomena. The present invention predicts electrical phenomena as well as tornadoes and the like.

U.S. Pat. No. 5,444,530, issued to Ting-I Wang on Aug. 22, 1995, describes a remote monitor for airfields which employs distortion of partially coherent light to detect precipitation and identify the same as rain or snow. By contrast, the present invention monitors different parameters of the atmosphere, notably temperature, humidity, barometric pressure, light, and static charge. The present invention infers presence of extreme weather conditions not analyzed by Wang, such as lightning and tornadoes.

None of the above inventions and patents, taken either singly or in combination, is seen to describe the instant invention as claimed.

SUMMARY OF THE INVENTION

The present invention combines weather detecting apparatus for detecting local conditions with communications apparatus for obtaining information relating to distant weather conditions. From this combination, a user may ascertain current local conditions which are not apparent to the senses and information regarding imminent or otherwise relevant conditions.

This combination of information enables a person to organize his or her activities appropriately. Detection of severe weather phenomena may cause a person to take actions to protect life and property in the immediate vicinity being monitored. Alternatively, a person may select an appropriate location for travel, if avoidance of local weather is required or if previous travel plans must be modified.

The novel weather station thus both analyzes and reports weather conditions. The communication apparatus enables selection of information from any selected location on the globe, and voice synthesizing apparatus for annunciating selected weather information in a selected language. The voice synthesizing apparatus further is capable of offering operating choice selection prompts in synthesized voice form and of responding to verbal selections by the user.

Preferably, weather conditions being monitored by sensing or by gleaning information from remote radio broadcasts relate to violent or severe conditions most likely to threaten life and property. Ambient characteristics which may be sensed to infer imminent actual weather conditions include temperature, humidity, light intensity, barometric pressure, and potential of ambient static charges. These conditions may then be analyzed by a data processor integral with the weather station to predict imminent weather conditions. The results may be annunciated either by synthesized voice or by indicating lights or the like. In particular, the communications apparatus of the novel weather station is compatible with different international cellular protocols, so that data corresponding to distant weather conditions is obtained by receiving distant local weather condition broadcasts.

The actual apparatus is quite compact, and comprises two separably connected sections. For this reason, the novel weather station is readily portable and easily utilized. A receiver section includes cellular circuitry enabling communications with the external world. A sensor section contains sensors for determining local weather conditions and a microprocessor for accomplishing the various functions of the weather stations. Each of the two separably connected sections has a battery for providing power enabling operation independently of the other respective section.

Accordingly, it is a principal object of the invention to provide a portable weather station which can predict local severe weather conditions.

It is another object of the invention to provide a portable weather station which can obtain information relating to remote weather conditions.

It is a further object of the invention that the weather station be operated to a significant extent by vocalized prompts.

Still another object of the invention is that the weather station be compatible with a variety of languages.

An additional object of the invention is to cooperate with a variety of international cellular protocols.

It is again an object of the invention that the novel weather station comprise two manually separable sections.

Yet another object of the invention is that the novel weather station carry on board a source of power for its operation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
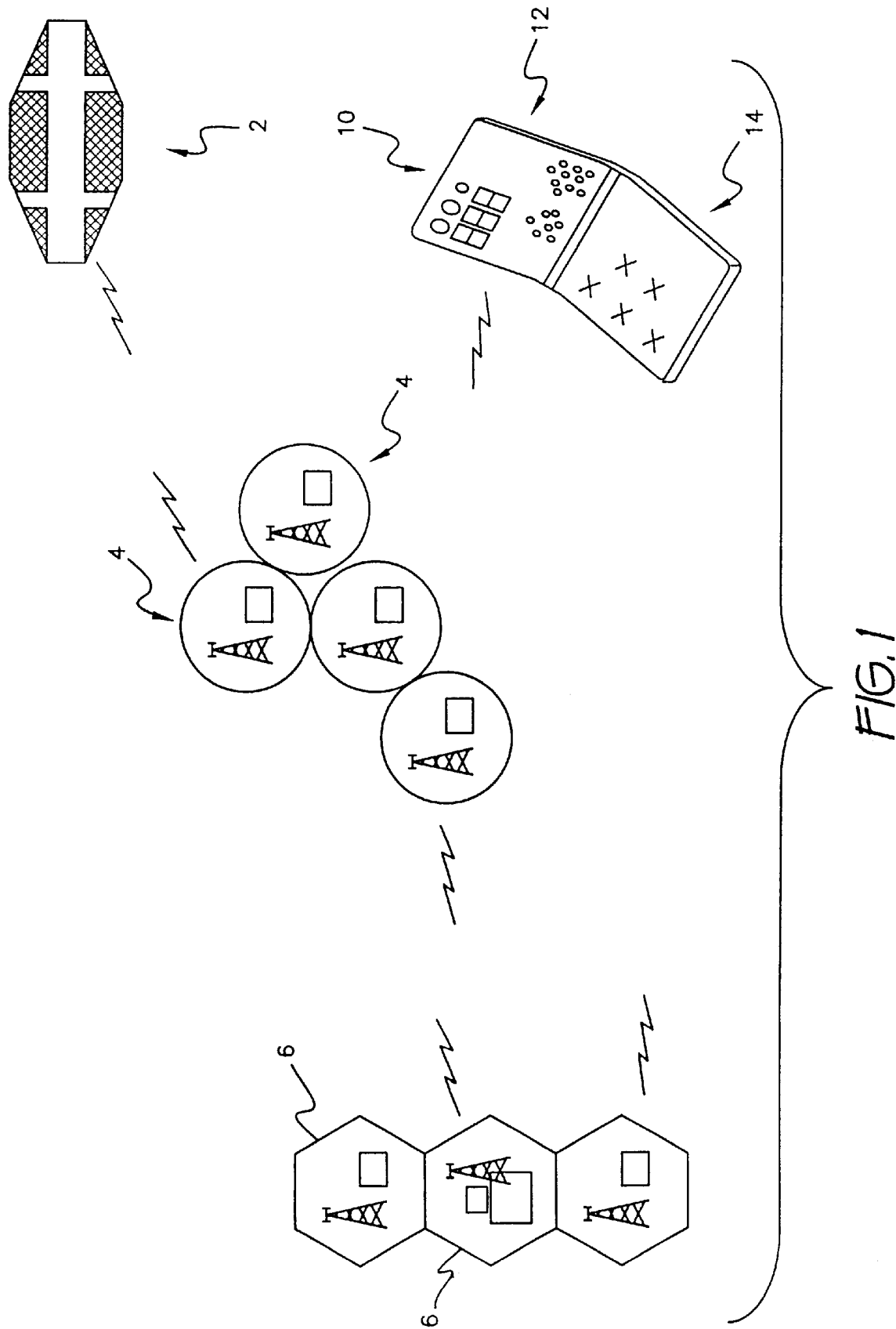
FIG. 1 is an environmental, diagrammatic view of the invention.

FIG. 1 of the drawings shows cooperation between the novel weather analyzing and reporting station 10 and a conventional communications system utilizing cellular technology. The conventional system includes weather satellites, represented by satellite 2, radio receiving and broadcasting facilities, represented by towers 4, and cellular transmission facilities, such as Mobile Telephone Switching Offices, represented by cells 6. Satellite 4, towers 6, and cells 8 are conventional. The novel weather station 10 cooperates with these conventional facilities in gathering weather data.

Weather station 10 comprises two manually separable sections, including a receiver section 12 having radio communication apparatus therein for communicating with an external cellular radio frequency communication system, as represented by cells 6, and a sensor section 14 containing sensors for sensing local ambient weather conditions. Receiver section 12 also contains a microprocessor 16 and a source of power for operating weather station 10. Sections 12 and 14 are removably connected to one another by structure which will be further described hereinafter.

Figure 2:
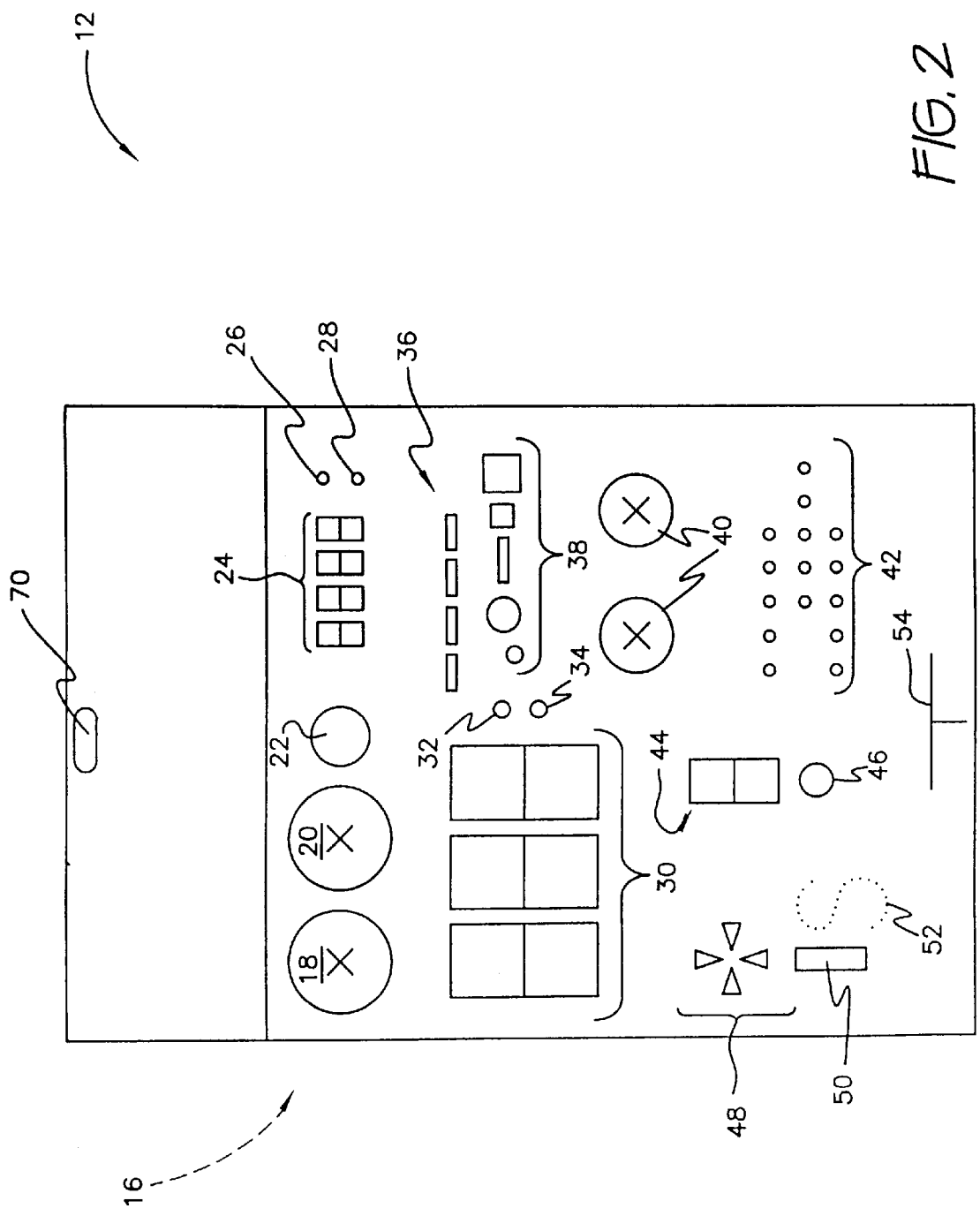
FIG. 2 is a front plan view of one of the two separable sections of the novel weather station, illustrating control and communications apparatus located on the exterior thereof, this section being referred to as a receiver section.

FIG. 2 shows the front panel of receiver section 12, whereon controls, visual displays, and a microphone 18 are mounted. An omnidirectional speaker 20 and a volume control 22 are disposed proximate microphone 18. A visual display 24 indicates date or time. Selector buttons 26, 28 enable selection of date or time to be indicated on display 24. A three digit display 30 is provided for indicating temperature. Selector buttons 32 and 34 select between Celsius and Fahrenheit scales. A display 36 indicates radio signal strength by progressive illumination of its individual illuminable elements.

A relative temperature display 38 indicates local temperature. A proximity sensor 40 detects whether the user is so close to weather station 10 as to interfere with reception of radio signals. An array 42 of light emitting diodes (LED) is utilized to display information regarding mode of operation. A master on-off switch 44 and a reset button 46 are provided. An emergency light 48 and a switch 50 for a purpose described hereinafter are disposed upon the front panel of receiver section 12. Switch 50 is identified by a bas relief or raised symbol 52 for the benefit of the blind. A T-LED 54 is disposed at the bottom of the front panel.

Figure 3:
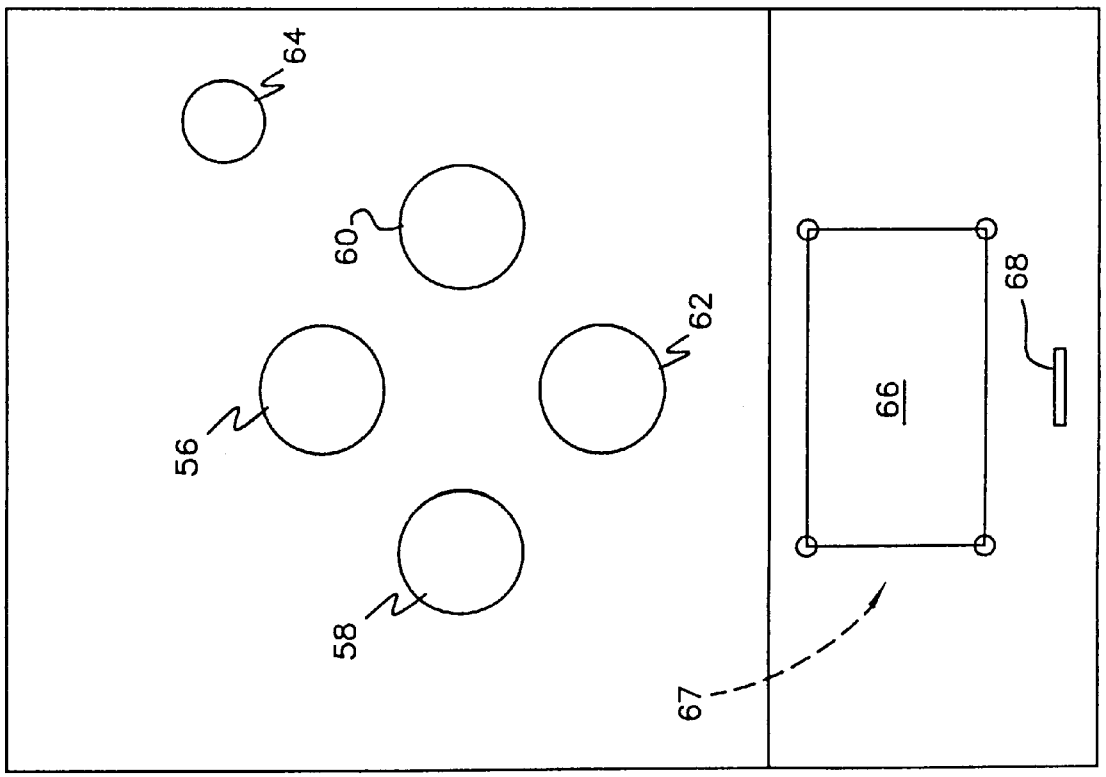
FIG. 3 is a front plan view of the other of the two separable sections of the novel weather station, illustrating components mounted on the exterior thereof, this section being referred to as a sensor section.

FIG. 3 shows components mounted on the exterior of sensing section 14. A temperature sensor 56, such as model MTS102, manufactured by Motorola Corporation, is provided to sense ambient temperature. A barometric pressure sensor 58, such as model MPX200A, manufactured by Motorola Corporation, senses ambient air pressure. A humidity sensor 60, such as model Minicap 2/5, manufactured by Panametrics Corporation, senses ambient humidity. A light sensor 62, which may be a model TSL235, as manufactured by Texas Instruments, senses visible light, and a static charge sensor 64, which may be model KML10/B/2, as manufactured by Phillips Semiconductor, senses ambient static potential. Sensors 56, 58, 60, 62, and 64 each incorporate a transducer for generating a data signal indicative of values of their respective sensed weather characteristics.

A closure 66 affording access to a battery 67 (concealed in FIG. 3) within sensor section 14 is also disposed upon the exterior of sensor section 14. Battery 67 is preferably a 9 volt lithium battery. A snap 68 for removably connecting sensor section 14 to receiver section 12 is provided. A corresponding second snap 70 (see FIG. 2) is located on receiver section 12.

Figure 4:
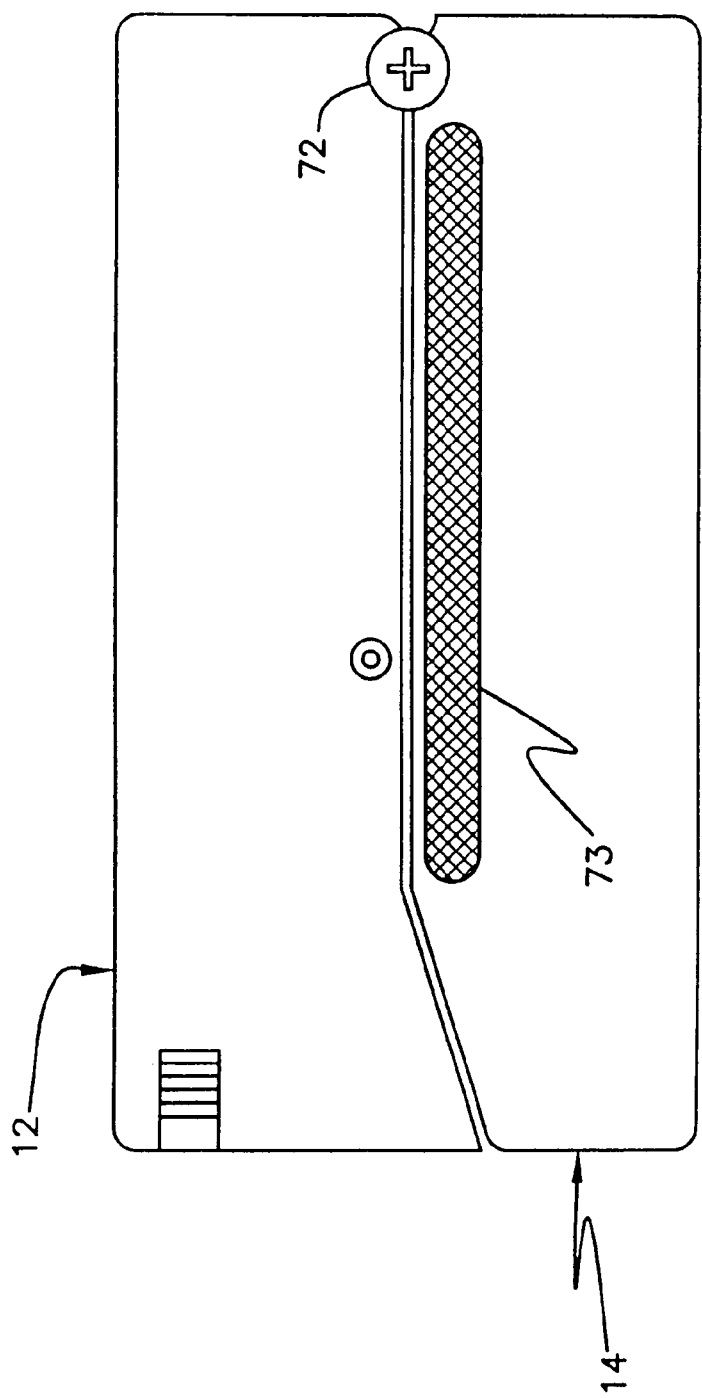
FIG. 4 is an end elevational view of the two sections of the novel weather station united.

FIG. 4 shows sections 12 and 14 connected. A screw 72 passes journaled or similarly entrapped within section 12 passes through a bored boss (not shown) formed in section 14. A screw (not shown) similar to screw 72 but oppositely directed is utilized at the opposite, concealed end of sections 12 and 14 to complement screw 72. Sections 12 and 14 are separated or disconnected by removal of these screws. A gold mesh protector 73 protects an antenna (further described hereinafter) serving sensor section 14.

Figure 5:
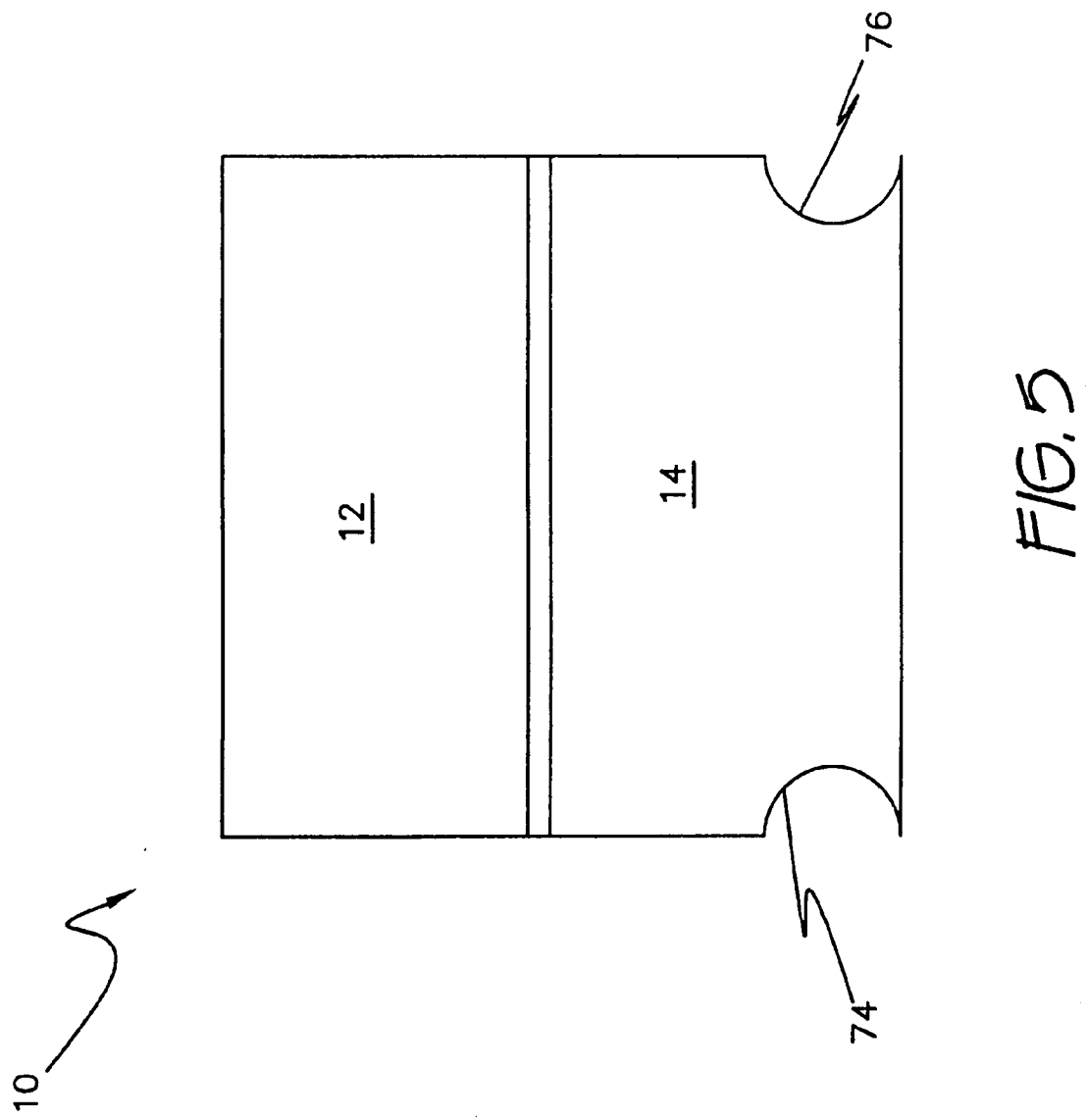
FIG. 5 is a side elevational view of FIG. 4.

FIG. 5 shows sections 12 and 14 connected, and clearly shows grooves 74, 76 formed in sensor section 14 for manually grasping sensor section 14.

Figure 6:
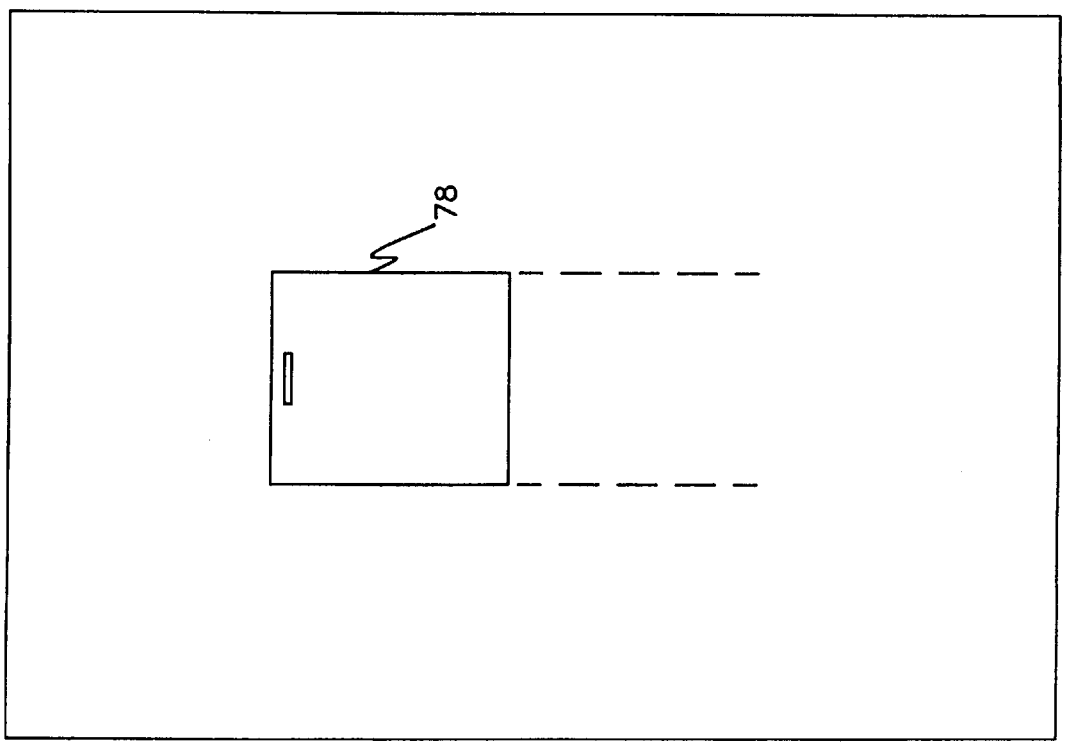
FIG. 6 is a rear plan view of the sensor section.

Referring now to FIG. 6, when separated or disconnected, sensor section 14 may be suspended from a selected external or environmental object (not shown) by the following arrangement. Sensor section 14 has a closure 78 which may be opened to reveal a chamber (not shown) and a strip of hook and loop fastener (not shown). The strip of hook and loop fastener extends outside the chamber so that it may be removably mated with a corresponding patch of hook or loop material (not shown) which has been permanently mounted on the selected environmental object. This arrangement allows temporary support of sensor section 14 in a designated location when not connected to receiver section 12. The chamber enclosing the strip of hook and loop material is sealed to prevent ingress of moisture into sensor section 14.

Figure 7:
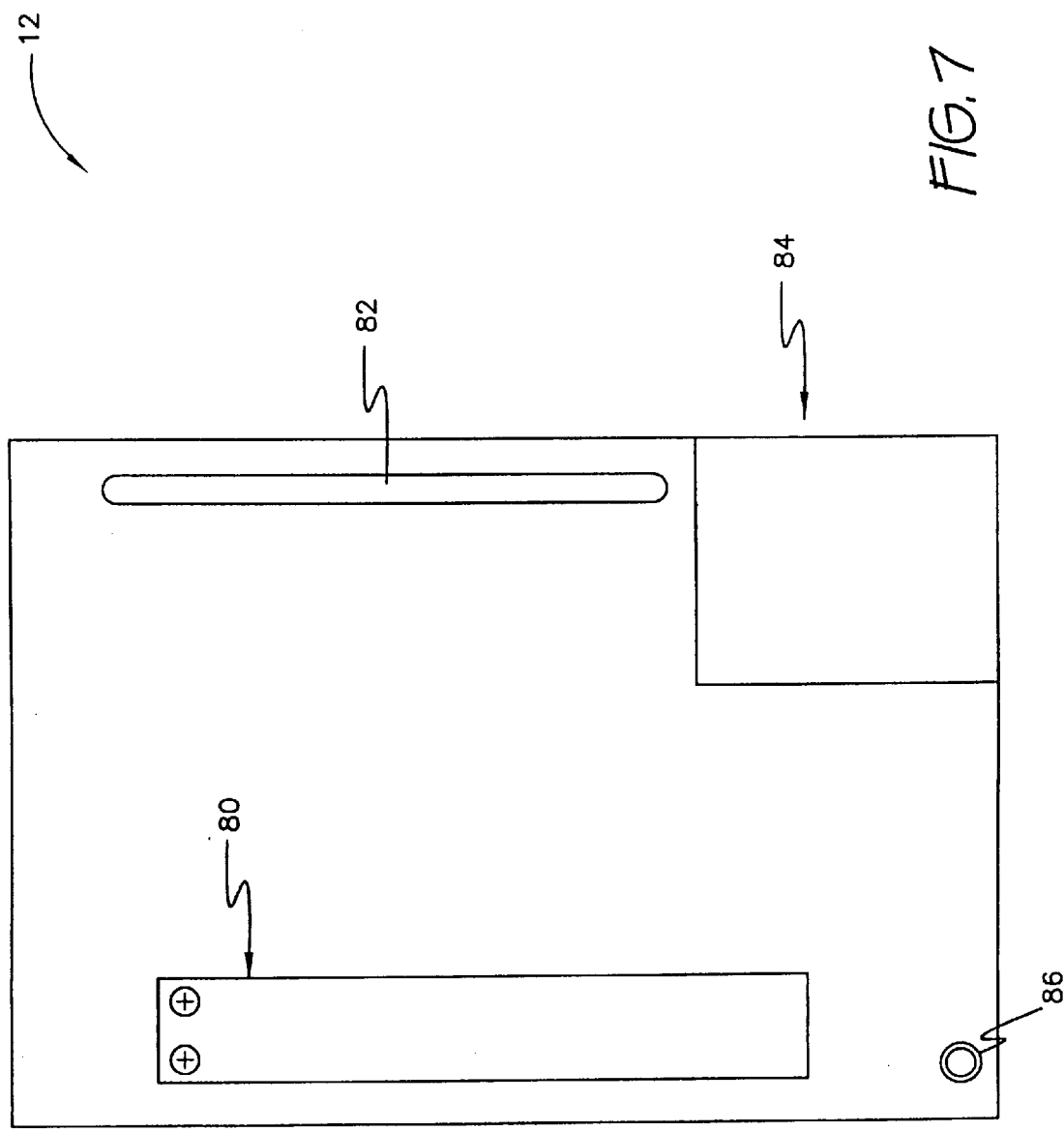
FIG. 7 is a rear plan view of the receiver section.

As shown in FIG. 7, receiver section 12 has an external antenna 80, a stepper motor controller 82, a power supply 84, and a standard DC power connection port 86. Power supply 84 comprises a converter for converting 120 volt AC power to nominal 12 volt DC power and a nominal 12 volt lithium battery. Port 86 is configured to accept any one of many well known connectors. Port 86 is electrically connected to power supply 84, so that supply 84 may be recharged when connected to an external source of power. When not so connected, receiver section 12 derives power from power supply 84.

Figure 8:
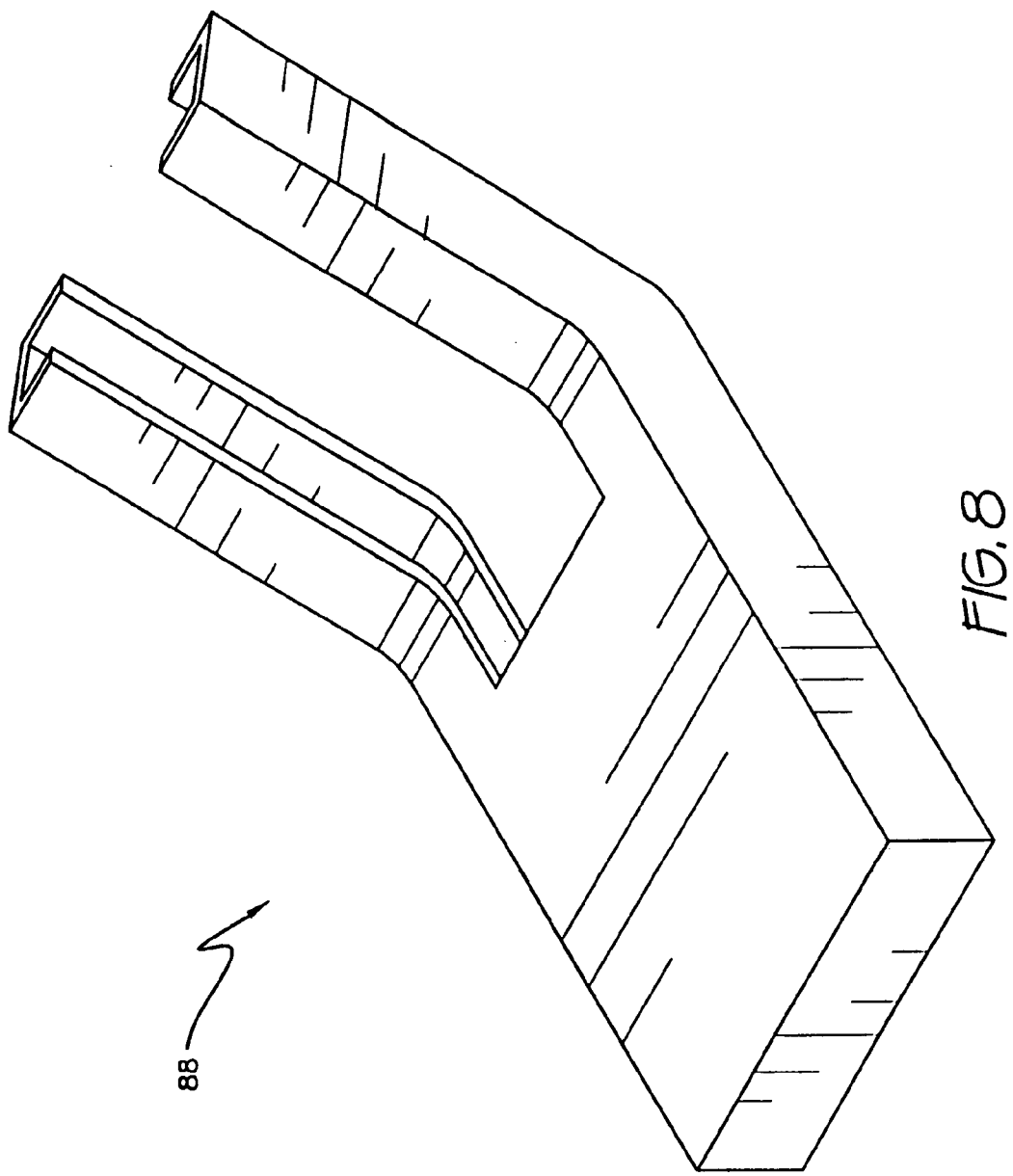
FIG. 8 is a perspective view of an accessory for supporting the receiver section when disconnected from the sensor section.

FIG. 8 illustrates a holder 88 for holding receiver section 12 when separated from sensor section 14. This feature enables receiver section 12 to be supported on any convenient horizontal surface (not shown) when detached or disconnected from sensor section 14.

Externally visible or accessible components of weather station 10 have been described thus far. Internal components and circuitry will now be described, with reference first to FIG. 9. A microprocessor 100 processes incoming data, stores historical data relating to weather, and manages the system by responding to control commands and issuing prompts where required and providing information to the user by visual and audible outputs. Historical data recorded for a selected immediate area of usage is stored in memory of a flash ROM 102. Microprocessor 100 may be a model 386 microprocessor by Intel Corporation, and flash ROM 102 may be model 28F400BX-T, also by Intel. A voice recognition and simulation system enables bidirectional vocal communication between weather station 10 and the user.

Incoming data is received either from sensor section 14 or by radio transmission from remote, external weather data broadcasting sources, as summarized in FIG. 1. Data derived by sensing is received by antenna 104 and communicated to conventional 49 MHz transmission and reception circuitry 106. Incoming signals are processed by a decoder and encoder 108, and are digitized within an analog-to-digital and digital-to-analog converter 110. Decoder and encoder 108 may be model HT12E/HT12D, by Holtek Corporation. Digitized data is then communicated to microprocessor 100 and flash ROM 102.

Incoming data received from external sources at 800 MHz frequency is processed as follows, referring now to FIG. 10. 800 MHz signals are received by antenna 112 and communicated to a duplex filter 114 which switches between transmission and reception functions. Duplex filter 114 may be model DFY2RB36CR881BTJ, by Phillips Semiconductor. Data then passes to an 800 MHz receiver 116 and subsequently to a data processor 118 and to a microcontroller 120. Data processor 118 may be may be model UMA1000, as manufactured by Phillips Semiconductor, and microcontroller 120 may be model 8XC51RA, as manufactured by Intel. From microcontroller 120, data is passed to a flash ROM 122 (see FIG. 9) and subsequently to microprocessor 100 (see FIG. 9).

Figure 10:
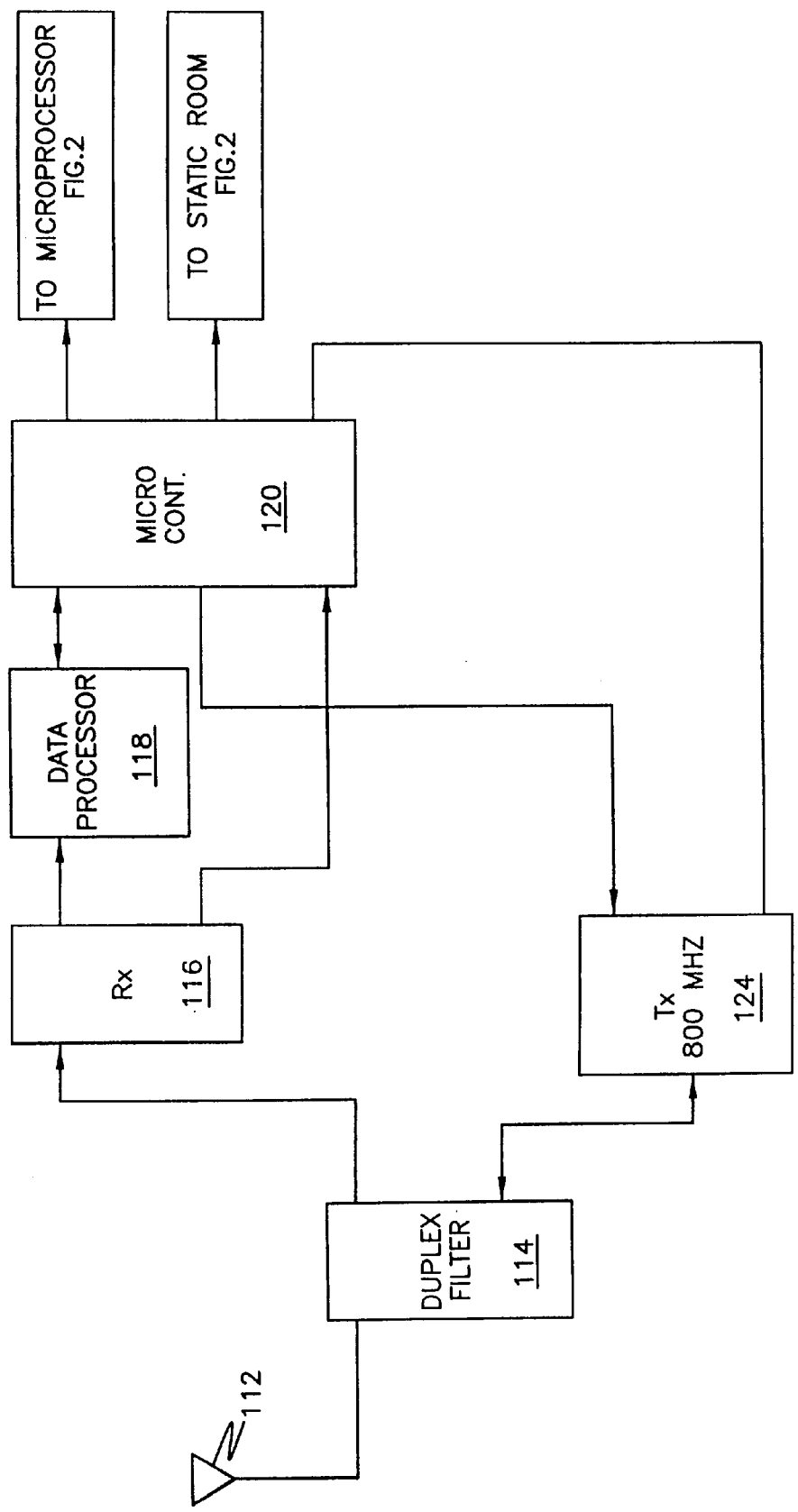
FIG. 10 is a diagram of internal data and signal processing components relating to 800 MHz frequency communications, and is an extension of the diagram of FIG. 10.

800 MHz transmissions by weather station 10 are enabled by a transmission module 124 incorporated into the 800 MHz circuitry shown in FIG. 10. Transmission module 124 may be model BGY110D.

Figure 11:
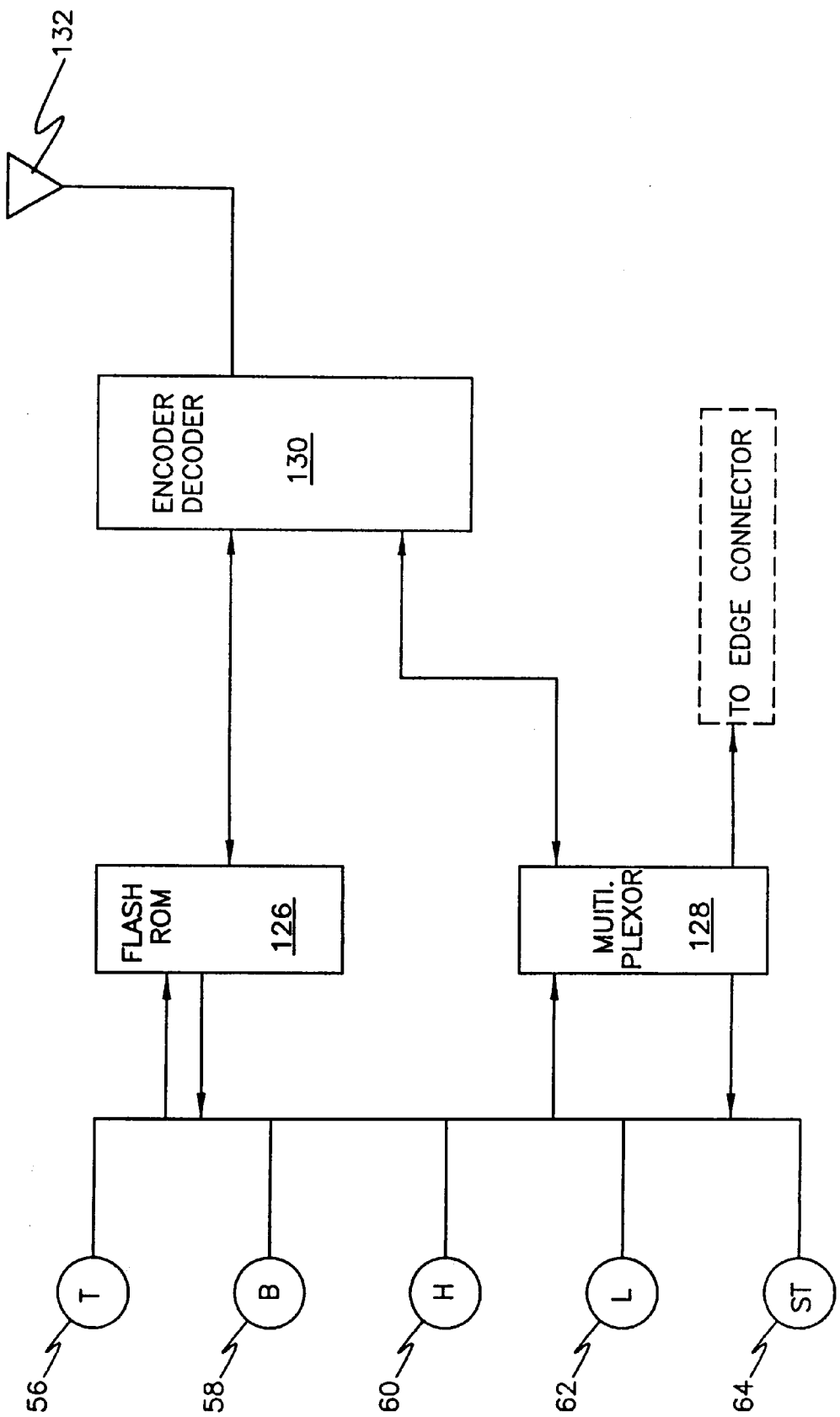
FIG. 11 is a diagram of internal data and signal processing components and associated interconnections of the sensor section.

Internal components of sensor section 14 are illustrated in FIG. 11. Sensors 56, 58, 60, 62, 64 communicate with a flash ROM 126 and with a multiplexer 128, which is connected to an encoder and decoder 130. Output of encoder and decoder 130 is transmitted by antenna 132 for reception by antenna 104 of receiving unit 12 (see FIG. 9). Antenna 132 is protected by gold mesh protector 73 shown in FIG. 4. Flash ROM 126 may be model 28F010-15, as manufactured by Intel, and multiplexer 128 may be a model 74151. Encoder and decoder 130 may be a model HT12E/HT12D, as manufactured by Holtek.

Because sections 12 and 14 are separable, each has an internal antenna 104 (see FIG. 9) or 132 for enabling mutual communication. With the exception of sensors 56, 58, 60, 62, 64, antenna 132 and its associated circuitry, and battery 67, all internal components described thus far are located in receiving section 12.

Figure 12:
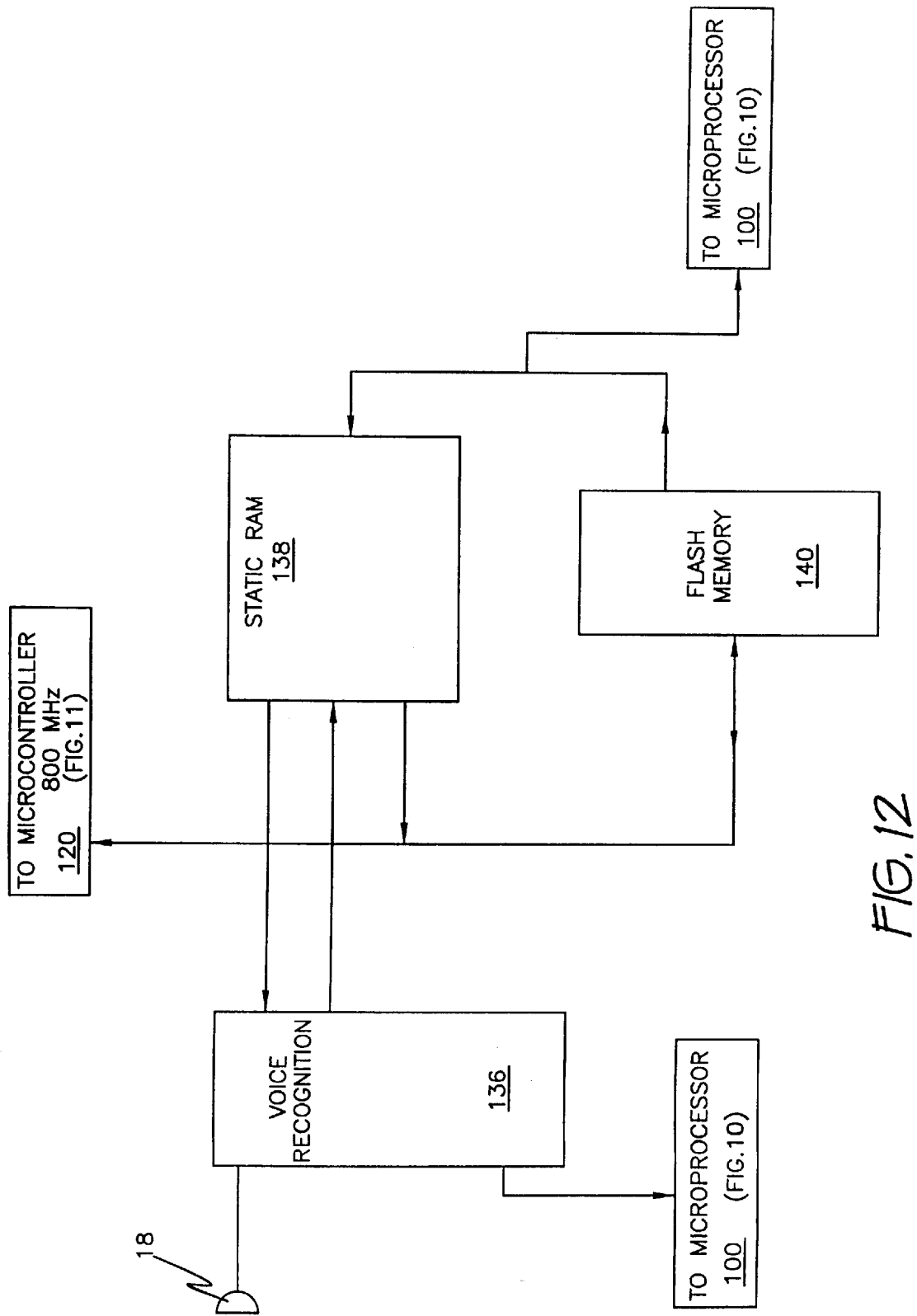
FIG. 12 is a diagram of voice recognition circuitry components and interconnections, and is an extension of the diagram of FIG. 10.

Referring now to FIG. 12, voice simulation and recognition apparatus is also contained within receiver section 12. Voice recognition apparatus includes microphone 18 which is connected to a voice recognition device 136.

Microphone 18 is located on receiver section 12 in any suitable location for receiving responses and commands spoken by the user. Device 136 is a model UPD 77501, as manufactured by NEC, and is a high quality speech recording and playback LSI. Device 136 communicates with a static RAM device 138 and a flash ROM memory device 140. Static RAM device 138 is preferably a 1 meg, 8 byte 128×8 RAM device, model MCM 6726, as manufactured by Motorola. Flash ROM device 140 is preferably a model 28F400BX-T, as manufactured by Intel.

Figure 9:
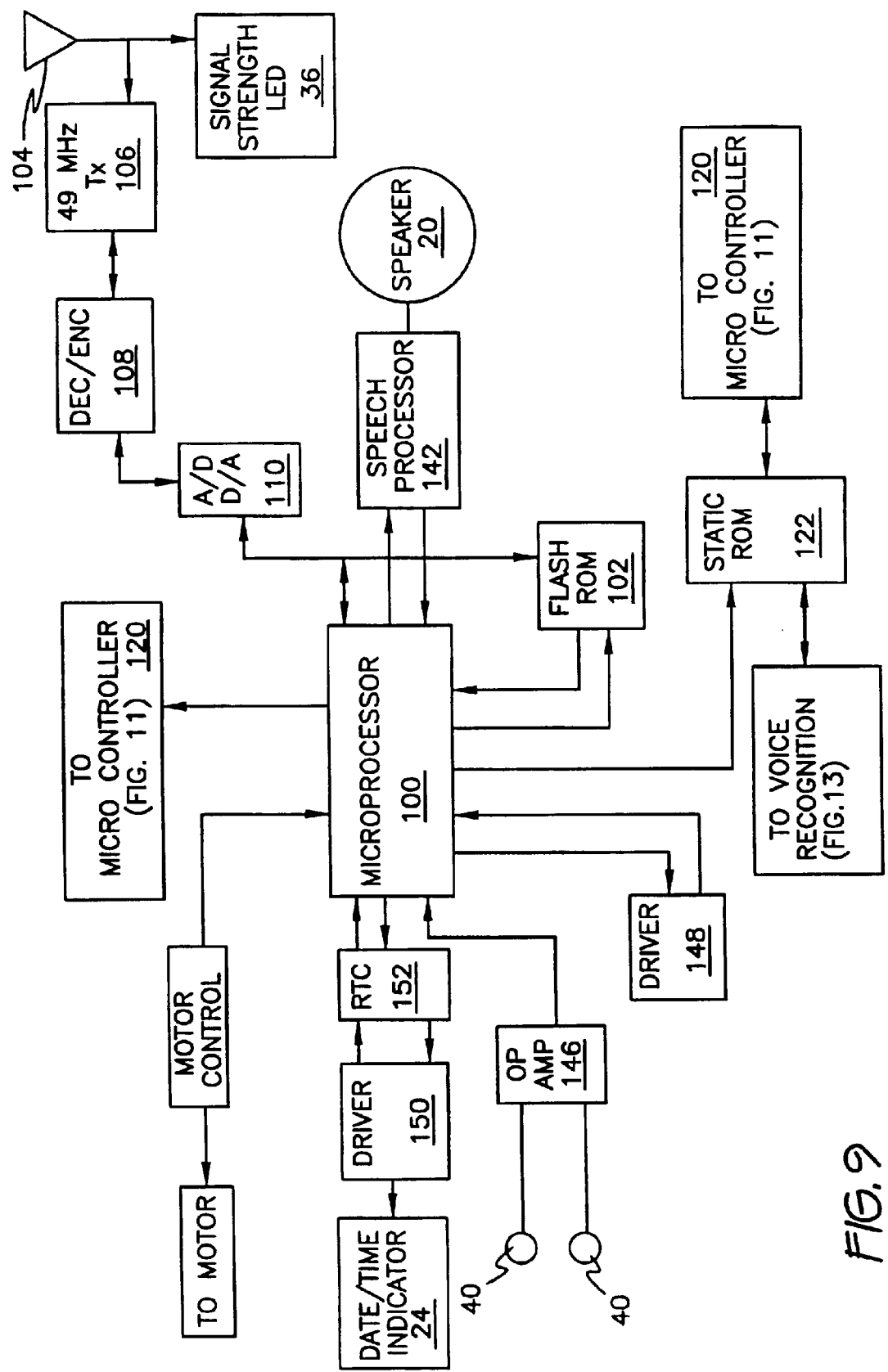
FIG. 9 is a diagram of internal data and signal processing components of the receiver section and their interconnections.

Voice simulation apparatus is shown in FIG. 9, and includes a 1 Megabyte speech data ROM integrated chip, or digital speech processor 142. Speech processor 142 is a stand alone masked ROM device, and is preferably a model 7758A, as manufactured by NEC. Output of speech processor 142 is projected from speaker 20.

Also shown in FIG. 9 are operative connection of proximity sensors 40 to microprocessor 100 through an operational amplifier 146, and drivers 148, 150 for driving visual indicators and alarm. Driver 150 is associated with a real time clock 152, and drives date and time indicator 24.

Figure 13:
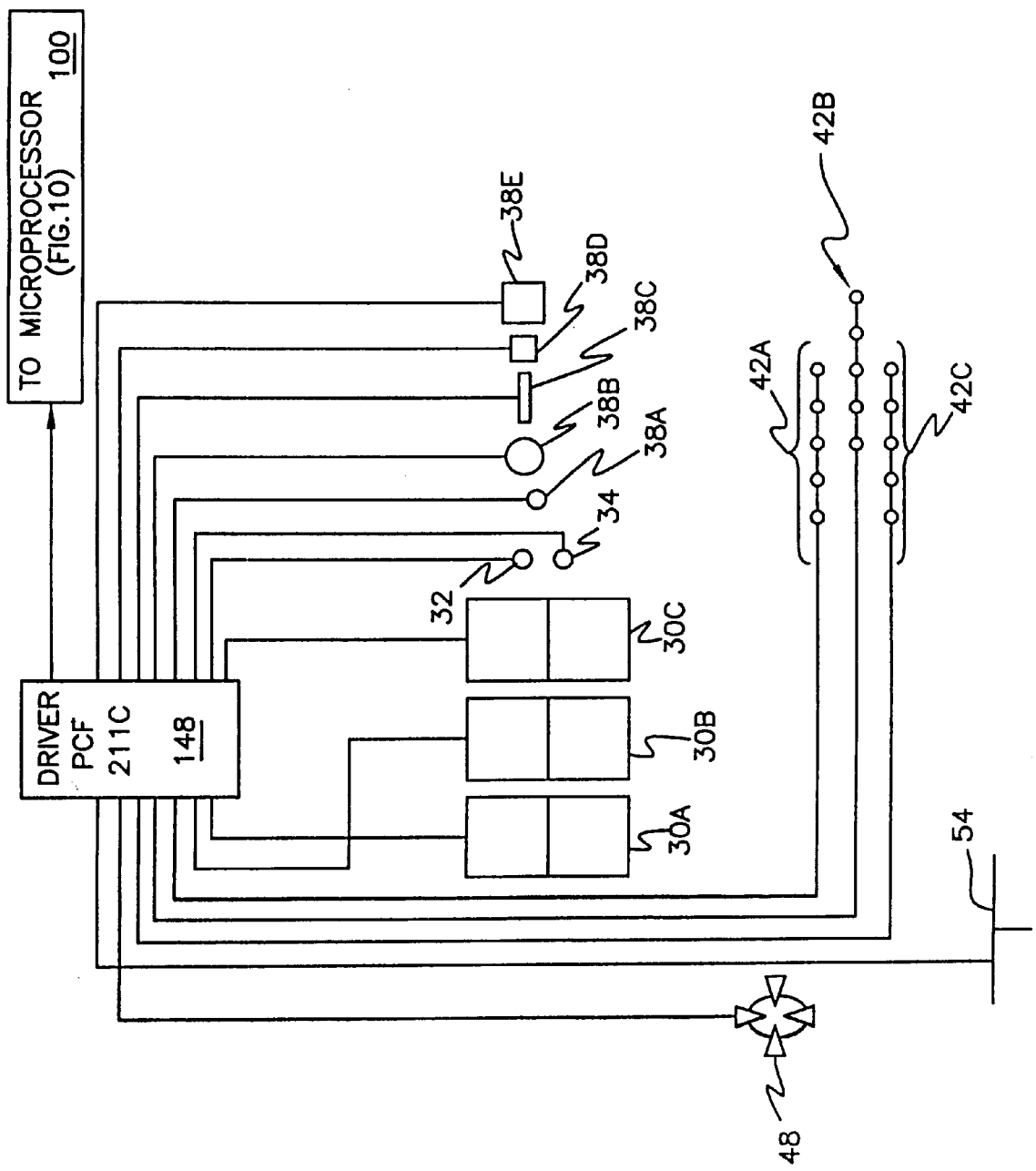
FIG. 13 is a diagram of a visual indicator driver and its driven indicators and interconnections therebetween, and is an extension of the diagram of FIG. 10.

Driver 148 drives many of the visual indicators disposed upon the front exterior surface of receiving section 12. These connections are shown in detail in FIG. 13. In FIG. 13, it will be seen that display 30 comprises three independent display panels 30A, 30B, and 30C, each capable of displaying a different symbol. Similarly, relative temperature display 38 indicates temperature in several individual steps or range increments by illuminating individual illuminable elements 38A, 38B, 38C, 38D, 38E.

Array 42 of LEDs comprises three independent groups of LEDS 42A, 42B, 42C. This array indicates mode of operation with respect to gathering of broadcast weather data relating to local weather (LEDs 42A), local continent (LEDs 42B), or international continent (LEDs 42C).

Operation of weather station 10 will now be described. Weather station 10 may be operated in any one of three modes. In a local reporting mode, weather station 10 reports conditions, either with sections 12 and 14 connected or separated. The local reporting mode is indicated by illumination of LEDs 42A. A local continent or country reporting mode is signalled by illumination of LEDs 42B. An international or global reporting mode is signalled by illumination of LEDs 42C. Local reporting may proceed with or without connection of sensor section 14. If connected and delivering data, LED 54 will illuminate.

To operate, it is required that switch 42 be on, that proximity sensors 40 detect a person disposed immediately in front of receiver section 12, and that an appropriate voice command or radio frequency signal be received. When the first two conditions are satisfied, reception of a radio signal indicative of severe weather conditions will initiate operation. Microprocessor 100 (see FIG. 9) is provided with a five year history of weather data for the geographic area selected to be monitored, and with algorithms for comparing input data to stored data to determine correlation to severe weather conditions. These weather conditions include tornadoes, high winds, lightning, high level of rainfall, among others. Correlation of input data with a severe weather condition will cause operation.

If no such correlation is received and the first two conditions for operation are present, a control algorithm will initiate a series of vocalized prompts generated by speech processor 142 and speaker 20 (see FIG. 9). When a verbal response is received, recognized, and correlated to predetermined responses by microphone 18 and associated voice recognition circuitry shown in FIG. 12, commands are executed and further verbal prompts, as appropriate, are generated.

One selection that is made by the user responsive to a prompt is the geographic area that is to be regarded as local. This information may be provided by the user verbally by responding with the latitude and longitude of the selected local area, or with a nearby city and state, according to initial programming of weather station 10.

Certain verbal prompts occur only during initial preparation of weather station 10, and are programmed such that once answered, they will not be repeated at each usage of weather station 10. These prompts concern language selection, as will be discussed hereinafter, and intervals and nature of audible alarms which sound automatically when microprocessor 100 determines that there is a high probability of severe weather conditions. A value relating to threshold of probability of severe conditions may also be included in prompts for initially preparing weather station 10.

When operating in the local reporting mode, sensors 56, 58, 60, 62, 64 periodically sense conditions and transmit collected data to microprocessor 100 for assessment of conditions and annunciation of the same. Routine information such as temperature is indicated on display 30 or relative temperature display 38, which indicates a range rather than specific values, as indicated on display 30. If severe conditions are calculated as probable, an audible alarm in the form of a high pitched tone or a simulated voice message in the selected language is sounded from speaker 20. After the user responds to predetermined verbal prompts to assure that correct selections are made, sensing becomes dormant and will reactivate at predetermined intervals, such as every fifteen minutes.

Memory of weather station 10 is loaded with data corresponding to a selected historic base time period, such as the previous five years. Real time weather data received by antenna 104 is reconfigured by digital-to-analog converter 110 and is routed to microprocessor 100 and to flash ROM 102. Analysis by comparison to known or pre-calculated conditions will generate outputs conducted to visual indicators shown in FIG. 2 and, if predetermined threshold values are met, sound an alarm as described above. In addition to an audible alarm, emergency indicator 48 will illuminate.

Voice recognition utilizes adaptive differential pulse code modulation (ADPCM). Speech processor 142 features low-pass filtering microphone amplifiers with a variable fixed gain ADPCM coder and decoder. Voice recognition device 136 receives a pulse code modulated signal from microphone 18. The signal is low pass filtered, converted to a ten bit digital value and converted to ADPCM. After conversion by the analog-to-digital converter 110, the signal is encoded to a shortened ADPCM code, such as two, three, or four bits. From the analysis circuit, the data is routed to external memory utilizing static RAM device 138 and associated flash ROM device 140. Data is retrieved when microprocessor addresses the voice recognition circuitry.

In the local reporting mode, LEDs 42A (see FIG. 13) will be illuminated. LED 38E is preferably red in color, and will indicate temperatures exceeding ninety degrees Fahrenheit. LED 38D is preferably amber in color, and indicates temperatures in a range of seventy to ninety degrees. LED 38C is preferably green in color, and indicates temperatures in a range of fifty to seventy degrees. LED 38B is preferably blue in color, and indicates temperatures in a range of thirty to fifty degrees. LED 38A is preferably red in color and indicates temperatures below thirty degrees Fahrenheit.

LED 54 will illuminate when the local reporting mode is in operation. This serves as warning that only local weather data is being reported.

To select a reporting mode, or to change an existing selection, switch 42 is switched to on, or switched to off followed by switching to on, if weather station 10 is already operating. Predetermined simulated voice prompts will request responses in a preselected code. This may comprise a letter or number corresponding to a particular selection, rather than a value or location being selected.

Language of communication is selected at this time. When a language prompt is answered in a preferred language, all responses by the user thereafter will be treated in the selected language, and all simulated voice prompts will be issued in the selected language. It is preferred that the memory of weather station 10 be loaded to include a range of languages for selection. Preferred languages include English, Spanish, German, French, Russian, Arabic, one or more Chinese dialects, Italian, and Japanese.

Within the U.S., NOAA Weather Radio is monitored for the standard 1050 Hz tone employed by the NOAA to indicate an emergency. Detection of this tone preferably triggers an appropriate alarm and may initiate a simulated vocal query to monitor specific severe conditions, such as identified existing hurricanes, tropical storms, and the like.

When selecting the international or global reporting mode, connection with the appropriate remote cellular protocol is arranged by prompts. Memory of weather station 10 is loaded with available international protocols to assure reception of the requested data.

After certain necessary selections have been made, weather station 10 will issue a general query as to other requirements not addressed by prompts. These may be specified by utilizing a prearranged code or signal.

When initial prompts have been satisfactorily answered, a vocal signal will be issued. Preferably, this signal will be a distinctive sound, such as the Boatswain's Whistle. The Boatswain's Whistle is a melody employed by the U.S. Naval Fleet.

It is to be understood that the present invention is not limited to the embodiments described above, but encompasses any and all embodiments within the scope of the following claims.

I claim:

1. A portable weather analyzing and reporting station comprising: a sensing circuit configured to sense at least one characteristic of local weather conditions, and further configured to generate a data signal representing the at least one characteristic;

a transmitter coupled to the sensing circuit and configured to wirelessly transmit the data signal;

a receiver configured to wirelessly receive the data signal;

a storage device configured to store a characteristic of at least one of a plurality of past weather conditions;

a processor coupled to the receiver and the storage device and configured to generate a prediction of a potential local weather condition, the prediction being based on the data signal received by the receiver and at least one of the characteristics of the weather conditions stored in the storage device; and an indicating circuit configured to indicate the prediction.

2. The weather analyzing and reporting station of claim 1, wherein each of the past weather conditions are past local weather conditions.

3. The weather analyzing and reporting station of claim 1, wherein each of the characteristics of the past weather conditions are characteristics sensed by the sensing circuit.

4. The weather analyzing and reporting station of claim 1, wherein the indicating circuit includes an indicator configured to audibly indicate the prediction.

5. The weather analyzing and reporting station of claim 1, wherein the indicating circuit includes an indicator configured to visually indicate the prediction.

6. The weather analyzing and reporting station of claim 1, further including:

a first housing including the sensing circuit and the transmitter; and a second housing including the receiver, the processor, and the indicating circuit, the first and second housings configured to be physically separable from each other.

7. The weather analyzing and reporting station of claim 1, further including:

a first housing including the sensing circuit and the transmitter; and a second housing including the receiver, the processor, and the indicating circuit, the first and second housings being physically separate from each other.

8. The weather analyzing and reporting station of claim 1, further including:

a power connection port for receiving external power and for supplying power to the weather analyzing and reporting station; and a battery coupled to the power connection port for supplying power to the weather analyzing and reporting station when no external power is provided to the power connection port, the battery being configured to be recharged by the external power received by the power connection.

9. The weather analyzing and reporting station of claim 1, further including an interface coupled to the processor and configured to receive a threshold value, the processor being configured to determine whether a high probability of severe weather conditions exists based on a comparison of the threshold value with the characteristic sensed by the sensing circuit, the indicating circuit being configured to indicate, responsive to the processor, that severe weather conditions exist.

10. The weather analyzing and reporting station of claim 1, wherein the characteristics stored in the storage device include at least one of a rainfall value and a windspeed value.

11. A portable weather analyzing and reporting station comprising:

a first housing including:

a sensing circuit configured to sense at least one characteristic of local weather conditions, and further configured to generate a data signal representing the at least one characteristic, and a transmitter coupled to the sensing circuit and configured to wirelessly transmit the data signal; and a second housing including:

a receiver configured to wirelessly receive the data signal, a storage device configured to store a characteristic of at least one of a plurality of past weather conditions, a processor coupled to the receiver and configured to process the data signal received by the receiver, thereby generating a result based on the data signal, and an indicating circuit configured to indicate the result.

12. The weather analyzing and reporting station of the claim 11, wherein the first and second housings are configured to be physically separable from each other.

13. The weather analyzing and reporting station of claim 11, wherein the first and second housing are physically separate from each other.

14. The weather analyzing and reporting station of claim 1, wherein the indicating circuit is further configured to indicate a signal strength of the data signal being received by the receiver.

15. The weather analyzing and reporting station of claim 1, wherein the indicating circuit comprises a signal strength meter configured to indicate a signal strength of the data signal being received by the receiver.

16. The weather analyzing and reporting station of claim 1, wherein the sensing circuit includes a barometric pressure sensor, the data signal represents an amount of barometric pressure sensed by the barometric pressure sensor, and the indicating circuit is further configured to indicate the amount of barometric pressure represented by the data signal received by the receiver.

17. The weather analyzing and reporting station of claim 1, wherein the sensing circuit includes a humidity sensor, the data signal represents an amount of humidity sensed by the humidity sensor, and the indicating circuit is further configured to indicate the amount of humidity represented by the data signal received by the receiver.

18. The weather analyzing and reporting station of claim 1, wherein the sensing circuit includes a windspeed sensor, the data signal represents an amount of windspeed sensed by the windspeed sensor, and the indicating circuit is further configured to indicate the amount of windspeed represented by the data signal received by the receiver.

19. The weather analyzing and reporting station of claim 1, wherein the sensing circuit includes a rainfall sensor, the data signal represents an amount of rainfall sensed by the rainfall sensor, and the indicating circuit is further configured to indicate the amount of rainfall represented by the data signal received by the receiver.

20. The weather analyzing and reporting station of claim 1, wherein the sensing circuit includes an ambient light sensor, the data signal represents an amount of ambient light sensed by the ambient light sensor, and the indicating circuit is further configured to indicate the amount of ambient light represented by the data signal received by the receiver.

21. The weather analyzing and reporting station of claim 1, wherein the sensing circuit includes a static charge sensor, the data signal represents an amount of static charge sensed by the static charge sensor, and the indicating circuit is further configured to indicate the amount of static charge represented by the data signal received by the receiver.

22. The weather analyzing and reporting station of claim 9, wherein the interface includes a voice apparatus configured to receive and recognize a voice command representing the threshold value.

23. The weather analyzing and reporting station of claim 1, further including:
an interface coupled to the processor and configured to receive a threshold value; and
an alarm coupled to the processor, the alarm being configured to indicate an alarm condition responsive to a comparison of the data signal received by the receiver with the threshold value.

24. The weather analyzing and reporting station of claim 23, wherein the alarm includes an audible alarm.

25. The weather analyzing and reporting station of claim 23, wherein the interface includes a voice apparatus configured to receive and recognize a voice command representing the threshold value.

26. The weather analyzing and reporting station of claim 1, wherein the transmitter is configured to intermittently transmit the data signal at a predetermined interval.

27. The weather analyzing and reporting station of claim 11, further including:
an interface coupled to the processor and configured to receive a threshold value; and
an alarm coupled to the processor, the alarm being configured to indicate an alarm condition responsive to a comparison of the data signal received by the receiver with the threshold value.

28. The weather analyzing and reporting station of claim 27, wherein the alarm includes an audible alarm.

29. The weather analyzing and reporting station of claim 27, wherein the interface includes a voice apparatus configured to receive and recognize a voice command representing the threshold value.

30. The weather analyzing and reporting station of claim 11, wherein the transmitter is configured to intermittently transmit the data signal at a predetermined interval.

31. The weather analyzing and reporting station of claim 11, wherein the sensing circuit includes a barometric pressure sensor, and the data signal transmitted by the transmitter represents a barometric pressure sensed by the barometric pressure sensor.

* * * * *

UNITED STATES PATENT AND TRADEMARK OFFICE
CERTIFICATE OF CORRRECTION

PATENT NO. : 6,076,044
DATED : June 13, 2000
INVENTOR(S) : Anthony Brown It is certified that error appears in the above-identified patent and that said Letters Patent is hereby corrected as shown below:

On the title page, item [56] insret the following:

U. S. PATENT DOCUMENTS

| EXAMINER INITIAL | | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|---|
| | | 4 | 6 | 0 | 8 | 5 | 6 | 5 | 8/1986 | Sakamoto | | | |
| | | 4 | 2 | 5 | 9 | 8 | 6 | 4 | 4/1981 | Tavoni | | | |
| | | 4 | 2 | 8 | 7 | 7 | 6 | 2 | 9/1981 | Baer | | | |
| | | 4 | 4 | 4 | 7 | 8 | 8 | 4 | 5/1984 | Wada | | | |
| | | 4 | 6 | 4 | 2 | 7 | 8 | 5 | 2/1987 | Packard et al | | | |
| | | 4 | 8 | 3 | 9 | 6 | 4 | 5 | 6/1989 | Lill | | | |
| | | 5 | 0 | 1 | 9 | 9 | 7 | 7 | 5/1991 | LaPointe et al. | | | |
| | | | | | | | | | | | | | |

FOREIGN PATENT OR PUBLISHED FOREIGN PATENT APPLICATION

| | | DOCUMENT NUMBER | | | | | | | PUBLICATION DATE | COUNTRY OR PATENT OFFICE | CLASS | SUBCLASS | TRANSLATION YES | NO |
|---|---|---|---|---|---|---|---|---|---|---|---|---|---|---|
| | | 2 | 2 | 6 | 1 | 5 | 3 | 6 | A | 5/1993 | Great Britain | | | |

In Figure 10, "ROOM" has been deleted, and in its place --ROM-- has been inserted.

Signed and Sealed this

Twenty-seventh Day of March, 2001

*Attest:*

NICHOLAS P. GODICI

*Attesting Officer*    *Acting Director of the United States Patent and Trademark Office*

(12) EX PARTE REEXAMINATION CERTIFICATE (6733rd)
United States Patent
Brown

(10) Number: US 6,076,044 C1
(45) Certificate Issued: Mar. 31, 2009

(54) WEATHER DETECTOR

(75) Inventor: Anthony Brown, Suitland, MD (US)

(73) Assignee: Richmond IP Holdings, LLC, Richmond, VA (US)

Reexamination Request:
No. 90/008,412, Jan. 5, 2007

Reexamination Certificate for:
Patent No.: 6,076,044
Issued: Jun. 13, 2000
Appl. No.: 09/246,784
Filed: Feb. 1, 1999

Certificate of Correction issued Mar. 27, 2001.

Related U.S. Application Data

(63) Continuation of application No. 08/799,838, filed on Feb. 13, 1997, now Pat. No. 5,978,738.

(51) Int. Cl.
*G01W 1/04* (2006.01)
*G01W 1/10* (2006.01)
*G01W 1/00* (2006.01)

(52) U.S. Cl. ............................................................ 702/3
(58) Field of Classification Search ........................ None
See application file for complete search history.

(56) References Cited

U.S. PATENT DOCUMENTS

| | | | |
|---|---|---|---|
| 3,430,217 A | 2/1969 | Bridge et al. | |
| 3,603,951 A | 9/1971 | Bracken et al. | |
| 4,031,467 A | 6/1977 | Singleton et al. | |
| 4,218,755 A | 8/1980 | Root | |
| 4,259,864 A | 4/1981 | Tavoni | |
| 4,286,465 A | 9/1981 | Thomae | |
| 4,287,762 A | 9/1981 | Baer | |
| 4,318,076 A | 3/1982 | Whitfield | |
| 4,396,149 A | 8/1983 | Hirsch | |
| 4,403,296 A | 9/1983 | Prosky | |

(Continued)

FOREIGN PATENT DOCUMENTS

| | | |
|---|---|---|
| EP | 0 622 639 | 11/1994 |
| EP | 0 622 639 A2 | 11/1994 |
| EP | 0743 535 A1 | 11/1996 |
| EP | 0 743 535 A1 | 11/1996 |
| JP | 63-204896 | 8/1988 |

(Continued)

OTHER PUBLICATIONS

WS–2000 Wireless Weather Station http//www.rainwise.com/ws2000/index.html, date printed Dec. 7, 2005.

(Continued)

*Primary Examiner*—James Menefee

(57) ABSTRACT

A compact, portable weather station for predicting local extreme weather conditions and for reporting remote weather conditions. The weather station has sensors for determining local temperature, barometric pressure, humidity, ambient light, and ambient static charge. A microprocessor has memory for storing data relating to past weather conditions and data processing apparatus and algorithms for determining probable developing weather conditions responsive to sensed local conditions. The weather station has a radio receiver for communicating with global weather reporting communications systems utilizing cellular communications. Operating commands, predicted local weather conditions, and remote weather conditions are annunciated in synthesized voice in any one of a variety of predetermined languages. The weather station includes voice synthesizing and recognition apparatus for annunciating verbal prompts and weather conditions, and for responding to vocal control. The weather station is formed in two separable components, one having sensors and the other having radio communications apparatus. The microprocessor is preferably contained within the component having radio communications apparatus. Each component preferably has a battery for providing power.

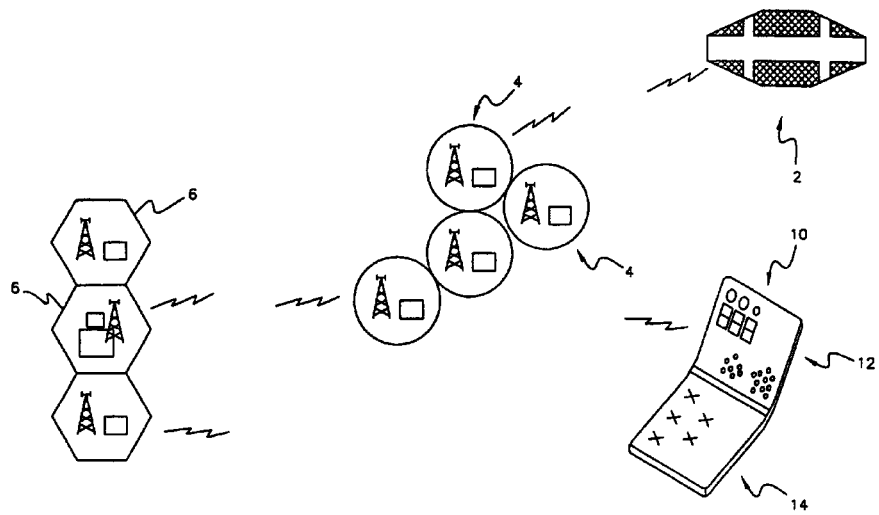

U.S. PATENT DOCUMENTS

| | | | |
|---|---|---|---|
| 4,506,994 A | 3/1985 | Schwab | |
| 4,627,277 A | 12/1986 | Baer | |
| 4,706,198 A | 11/1987 | Thurman | |
| 4,839,645 A | 6/1989 | Lill | |
| 4,888,986 A | 12/1989 | Baer et al. | |
| 4,903,222 A | 2/1990 | Carter et al. | |
| 4,912,459 A | 3/1990 | McCallie | |
| 4,992,942 A | 2/1991 | Bauerle et al. | |
| 5,019,977 A | 5/1991 | LaPointe et al. | |
| 5,038,607 A | 8/1991 | Baer et al. | |
| 5,105,191 A | 4/1992 | Keedy | |
| 5,117,690 A | 6/1992 | Baer | |
| 5,178,010 A | 1/1993 | Holzel | |
| 5,245,874 A | 9/1993 | Baer | |
| 5,255,556 A | 10/1993 | Lobdell | |
| 5,345,538 A | 9/1994 | Narayannan et al. | |
| 5,347,476 A | 9/1994 | McBean, Sr. | |
| 5,390,237 A | 2/1995 | Hoffman, Jr. et al. | |
| 5,444,433 A | 8/1995 | Gropper | |
| 5,499,024 A | 3/1996 | Germanton et al. | |
| 5,509,295 A | 4/1996 | Bartoli | |
| 5,517,193 A | 5/1996 | Allison et al. | |
| 5,526,268 A | 6/1996 | Tkacs et al. | |
| 5,568,385 A | 10/1996 | Shelton | |
| 5,615,118 A | 3/1997 | Frank | |
| 5,630,210 A | 5/1997 | Marry et al. | |
| 5,689,654 A | 11/1997 | Kikinis et al. | |
| 5,696,671 A | 12/1997 | Oliver | |
| 5,717,589 A | 2/1998 | Thompson et al. | |
| 5,734,335 A | 3/1998 | Brogi et al. | |
| 5,781,852 A | 7/1998 | Gropper | |
| 5,796,932 A | 8/1998 | Fox et al. | |
| 5,848,378 A | 12/1998 | Shelton et al. | |
| 5,850,619 A | 12/1998 | Rasmussen et al. | |
| 5,920,827 A | 7/1999 | Baer et al. | |
| 5,943,630 A | 8/1999 | Busby et al. | |
| 5,978,738 A | 11/1999 | Brown | |
| 6,014,606 A | 1/2000 | Tu | |
| 6,202,023 B1 | 3/2001 | Hancock et al. | |
| 6,597,990 B2 | 7/2003 | Brown | |

FOREIGN PATENT DOCUMENTS

| | | | |
|---|---|---|---|
| JP | 01-282487 | | 11/1989 |
| JP | 02-141692 | | 5/1990 |
| JP | 03-018789 | | 1/1991 |
| JP | 05-005788 | | 1/1993 |
| JP | 05-005789 | | 1/1993 |
| JP | 05-008486 | | 1/1993 |
| JP | 05-027048 | | 2/1993 |
| JP | 05-50389 | | 3/1993 |
| JP | 05-052965 | | 3/1993 |
| JP | 05-060879 A | * | 3/1993 |
| JP | 05-249252 | | 9/1993 |
| JP | 05-341055 | | 12/1993 |
| JP | 05-341056 | | 12/1993 |
| JP | 06-059054 | | 3/1994 |
| JP | 06-088880 | | 3/1994 |
| JP | 06-167577 | | 6/1994 |
| JP | 06-324163 | | 11/1994 |
| JP | 07-007769 | | 1/1995 |
| JP | 07-012959 | | 1/1995 |
| JP | 07-077583 | | 3/1995 |
| JP | 07-077584 | | 3/1995 |
| JP | 07-0129546 | | 5/1995 |
| JP | 07-191152 | | 7/1995 |
| JP | 08-005761 | | 1/1996 |
| JP | 08-029545 | | 2/1996 |
| JP | 08-029546 | | 2/1996 |
| WO | WO 94/16394 | | 7/1994 |
| WO | WO 97/13161 | | 4/1997 |
| WO | WO 97/28460 | | 8/1997 |
| WO | WO 97/35209 | | 9/1997 |

OTHER PUBLICATIONS

An Overview of NHC Prediction Models http://www.srh.noaa.gov/ssd/nwpmodel/html/nhcmodel.htm (pp. 1–10), date printed Jan. 28, 2005.

The only wireless indoor/outdoor temperature monitor (1 page), dated 1988.

RF Solutions Ltd. Holtck Enryption Chipset http://www.rf-solutions.co.uk/acatalog/Holtek_Encryption_Chipset.html (1 page), date printed Jan. 17, 2005.

Question No.–1307996.006 Weather Detection Device Novalynx file://C:\Documents%20and%20Settings\wsquire\Local%20 Settings\Temp\NERAC1.HTM (pp. 1–19), dated printed Jul. 1, 2005.

Question No.–1307996.007 Weather Detection Device Weather Forcasting file://C:\Documents%20and%20Settings\wsquire\Local%20Settings\Temp\NERAC1.HTM (pp. 1–51), dated printed Jul. 1, 2005.

100–2310 Wireless Weather Station http://www.novalynx.com/100-2310.html, date printed Jul. 1, 2005.

Kaplan, John, et al. "A Simple Emprical Model for Predicting the Decay of Tropical Cyclone Winds after Landfall" AOML/NOAA, Hurrican Research Division, 4301 Rickenbacker Causeway, Miami FL, 33149, pp. 2499–2512, dated Nov. 1995.

Sutherland, Robert A., "A Short Range Objective Nocturnal Temperature Forecasting Model" 1980 American Meterological Society pp. 247–255, dated Jan. 9, 1980.

Woodley, William L., et al., "The Interference of GATE Convective Rainfall from SMS–1–Imagery", Journal of Applied Meterology, vol. 19, pp. 388–408, Apr. 1980.

AAI SMI Systems Management, "Automated Surface Observing System (ASOS)", dated 1992.

Hard–To–Find–Tools Brookstone, Jul. 27, 2005 No. 186, p. 3–9.

Advertisement "The Windindicator" Weatherwise, Inc. Dec. 1995/Jan. 1996, p. 46.

Advertisement "The WS–2000 Wireless Solar Powered Weatherstation from Rainwise" Weatherwise Apr./May 1997, p. 51.

Advertisement "Comfortstat Weather Products Instruments for Weather and Many Other Uses", date unknown.

Advertisement "Don't Just Talk About the Weather, Predict It!" Weather Wise, Oct./Nov. 1995 p. 10.

Advertisement "Don't Just Talk About The Weather Predict It" Weatherwise, Aug./Sep. 1996, p. 43.

Advertisement "Inroducing the Weather Report The Complete Weather Station", Weatherwise, Aug./Sep. 1991, p. 54.

Advertisement "The Weather Report and Weather Report Logger" Weatherwise Aug./Sep. 1995, p. 52.

Advertisement "Be Your Own Weatherman," Weather Monitor II The Professional Home Weather Station, Davis Instruments, date unknown.

Advertisement "The Talking Weather Station" Itworks, date unknown.

Advertisement "MultiFAX Card and Software", date unknown.

Advertisement "Weatherwise Photography Contest", date unknown.

Advertisement "The Fourth Dimension Displaying Weather Over Time" Weather Dimensions, Inc., date unknown.

Advertisement "The Talking Weather Station Clima Talker" Windward Systems, Inc., date unknown.

Advertisement "Monitor Weather in Real Time on Your PC/Mac" Fascinating Electronics, Inc., unknown.

Advertisement "Serious Equipment for Serious Weather Watchers" Weather Wizard II, Weather Monitor II, Weatherlink, Davis Instruments, date unknown.

Advertisement "Why the new Ultimeter® 2000 is The World's best home weather station" Peet Bros. Company, date unknown.

* cited by examiner

US 6,076,044 C1

EX PARTE
REEXAMINATION CERTIFICATE
ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–25, 27–29 and 31 are cancelled.

Claims 26 and 30 are determined to be patentable as amended.

New claims 32–47 are added and determined to be patentable.

26. [The weather analyzing and reporting station of claim 1,] *A portable weather analyzing and reporting station comprising:*
   a sensing circuit configured to sense at least one characteristic of local weather conditions, and further configured to generate a data signal representing the at least one characteristic;
   a transmitter coupled to the sensing circuit and configured to wirelessly transmit the data signal;
   a receiver configured to wirelessly receive the data signal;
   a storage device configured to store a characteristic of at least one of a plurality of past weather conditions;
   a processor coupled to the receiver and the storage device and configured to generate a prediction of a potential local weather condition, the prediction being based on the data signal received by the receiver and at least one of the characteristics of the weather conditions stored in the storage device; and
   an indicating circuit configured to indicate the prediction;
wherein the transmitter is configured to intermittently transmit the data signal at a predetermined interval.

30. [The weather analyzing and reporting station of claim 11,] *A portable weather analyzing and reporting station comprising:*
   *a first housing including:*
      a sensing circuit configured to sense at least one characteristic of local weather conditions, and further configured to generate a data signal representing the at least one characteristic, and
      a transmitter coupled to the sensing circuit and configured to wirelessly transmit the data signal; and
   *a second housing including:*
      a receiver configured to wirelessly receive the data signal,
      a storage device configured to store a characteristic of at least one of a plurality of past weather conditions,
      a processor coupled to the receiver and configured to process the data signal received by the receiver, thereby generating a prediction based on the data signal, and
      an indicating circuit configured to indicate the prediction;
wherein the transmitter is configured to intermittently transmit the data signal at a predetermined interval.

*32. A portable weather analyzing and reporting station comprising:*
   *a first housing comprising a sensing circuit configured to sense at least one characteristic of local weather conditions, and further configured to generate a data signal representing the at least one characteristic; and a transmitter coupled to the sensing circuit and configured to wirelessly transmit the data signal;*
   *a second housing including a receiver configured to wirelessly receive the data signal;*
   *a storage device configured to store a characteristic of at least one of a plurality of past weather conditions;*
   *a processor coupled to the receiver and the storage device and configured to generate a prediction of a potential local weather condition, the prediction being based on the data signal received by the receiver and at least one of the characteristics of the weather conditions stored in the storage device; and*
   *an indicating circuit configured to indicate the prediction; and*
*wherein the first and second housings are configured to be physically connected to each other and physically separable from each other.*

*33. The weather analyzing and reporting station of claim 32, wherein the receiver comprises a visual indicator having a first section for displaying a time and a second section for displaying an indication of temperature.*

*34. The weather analyzing and reporting station of claim 33, wherein the time and temperature are displayed on two different rows.*

*35. The weather analyzing and reporting station of claim 33, wherein the time and temperature are displayed as two different sizes.*

*36. The weather analyzing and reporting station of claim 33, wherein the visual indicator includes a symbol indicative of weather.*

*37. The weather analyzing and reporting station according to claim 32, further comprising a holder to hold and support said second housing when said second housing is separated from said first housing.*

*38. The weather analyzing and reporting station according to claim 32, further comprising a holder to hold and support the second housing on a horizontal surface.*

*39. The weather analyzing and reporting station according to claim 32, wherein a user can select the geographic area that is to be regarded as local.*

*40. A portable weather analyzing and reporting station comprising:*
   *a first housing including:*
      *a sensing circuit configured to sense at least one characteristic of local weather conditions, and further configured to generate a data signal representing the at least one characteristic, and*
      *a transmitter coupled to the sensing circuit and configured to wirelessly transmit the data signal; and*
   *a second housing including:*
      *a receiver configured to wirelessly receive the data signal,*
      *a storage device configured to store a characteristic of at least one of a plurality of past weather conditions,*
      *a processor coupled to the receiver and configured to process the data signal received by the receiver, thereby generating a result based on the data signal, and* an indicating circuit configured to indicate the result and wherein the first and second housings are configured to be physically connected to each other and physically separable from each other.

41. The weather analyzing and reporting station of claim 40, wherein the receiver comprises a visual indicator having a first section for displaying a time and a second section for displaying an indication of temperature.

42. The weather analyzing and reporting station of claim 40, wherein the time and temperature are displayed on two different rows.

43. The weather analyzing and reporting station of claim 40, wherein the time and temperature are displayed as two different sizes.

44. The weather analyzing and reporting station of claim 40, wherein the visual indicator includes a symbol indicative of weather.

45. The weather analyzing and reporting station according to claim 40, further comprising a holder to hold and support said second housing when said second housing is separated from said first housing.

46. The weather analyzing and reporting station according to claim 40, further comprising a holder to hold and support the second housing on a horizontal surface.

47. The weather analyzing and reporting station according to claim 40, wherein a user can select the geographic area that is to be regarded as local.

* * * * *